United States Patent
Kaneshima

(10) Patent No.: US 11,091,574 B2
(45) Date of Patent: Aug. 17, 2021

(54) METHOD FOR PRODUCING VINYL ALCOHOL POLYMERS

(71) Applicant: KURARAY CO., LTD., Kurashiki (JP)

(72) Inventor: Takuma Kaneshima, College Station, TX (US)

(73) Assignee: KURARAY CO., LTD., Okayama (JP)

( * ) Notice: Subject to any disclaimer, the term of this patent is extended or adjusted under 35 U.S.C. 154(b) by 346 days.

(21) Appl. No.: 16/304,842

(22) PCT Filed: May 25, 2017

(86) PCT No.: PCT/JP2017/019613
§ 371 (c)(1),
(2) Date: Nov. 27, 2018

(87) PCT Pub. No.: WO2017/208974
PCT Pub. Date: Dec. 7, 2017

(65) Prior Publication Data
US 2020/0325259 A1    Oct. 15, 2020

(30) Foreign Application Priority Data
May 31, 2016 (JP) .............................. JP2016-108920

(51) Int. Cl.
| | | |
|---|---|---|
| C08F 2/38 | (2006.01) | |
| C08F 2/06 | (2006.01) | |
| C08F 4/34 | (2006.01) | |
| C08F 8/12 | (2006.01) | |
| C08F 216/06 | (2006.01) | |
| C08F 118/08 | (2006.01) | |

(52) U.S. Cl.
CPC .............. *C08F 216/06* (2013.01); *C08F 2/06* (2013.01); *C08F 2/38* (2013.01); *C08F 4/34* (2013.01); *C08F 8/12* (2013.01); *C08F 118/08* (2013.01); *C08F 2800/20* (2013.01)

(58) Field of Classification Search
CPC ........ C08F 216/06; C08F 118/08; C08F 2/38; C08F 4/34; C08F 8/12; C08F 2/06; C08F 2800/20
See application file for complete search history.

(56) References Cited

U.S. PATENT DOCUMENTS

2016/0194412 A1    7/2016 Fukuhara et al.

FOREIGN PATENT DOCUMENTS

| CN | 105218713 A | 1/2016 | |
|---|---|---|---|
| EP | 2 876 116 A1 | 5/2015 | |
| EP | 3 031 829 A1 | 6/2016 | |
| EP | 3031829 A1 * | 6/2016 | ............... C08F 2/30 |
| GB | 1251570 A | 10/1971 | |
| JP | 46-22209 B1 | 6/1971 | |
| JP | 57-28121 A | 2/1982 | |
| JP | 64-26602 A | 1/1989 | |
| JP | 9-202812 A | 8/1997 | |
| JP | 2001-261711 A | 9/2001 | |
| JP | 2002-69105 A | 3/2002 | |
| WO | WO 2015/019614 A1 | 2/2015 | |

OTHER PUBLICATIONS

International Search Report dated Jul. 18, 2017 in PCT/JP2017/019613 filed May 25, 2017.
Extended European Search Report dated Jan. 3, 2020 in European Patent Application No. 17806531.4, 7 pages.

* cited by examiner

*Primary Examiner* — Robert D Harlan
(74) *Attorney, Agent, or Firm* — Morgan, Lewis & Bockius LLP

(57) ABSTRACT

The present invention provides an industrially advantageous method for producing vinyl alcohol polymers having a low degree of polymerization using a chain transfer agent having an aliphatic hydrocarbon group having 6 to 12 carbon atoms, the method being capable of producing a vinyl alcohol polymer whose aqueous solution has excellent viscosity stability. The present invention relates to a method for producing vinyl alcohol polymers, including: polymerizing a vinyl ester monomer (a) in the presence of a polymerization initiator (B) and a chain transfer agent (C) having an aliphatic hydrocarbon group having 6 to 12 carbon atoms to obtain a vinyl ester polymer (A); and saponifying the vinyl ester polymer (A) at a concentration of 40 mass % or more and 75 mass % or less in the presence of an acidic catalyst (D) to obtain a vinyl alcohol polymer, wherein the vinyl alcohol polymer has a viscosity-average degree of polymerization of 160 or more and 400 or less.

20 Claims, No Drawings

METHOD FOR PRODUCING VINYL ALCOHOL POLYMERS

TECHNICAL FIELD

The present invention relates to a method for producing vinyl alcohol polymers.

BACKGROUND ART

Suspension polymerization of vinyl compounds (such as vinyl chloride) is conventionally performed for the purpose of obtaining vinyl resins from the vinyl compounds. As dispersion stabilizers for the suspension polymerization of vinyl compounds, partially-saponified vinyl alcohol polymers (hereinafter, a vinyl alcohol polymer may be abbreviated as "PVA") are known to be used.

PVAs are industrially produced by polymerizing a vinyl ester monomer in an alcohol solution at atmospheric pressure and saponifying the resultant vinyl ester polymer. PVAs are used for various applications such as fiber processing, paper processing, films, adhesives, binders for various inorganic materials, and emulsion stabilizers. For such various applications, PVAs having widely varying degrees of polymerization are required. For polymerization of vinyl ester monomers, the use of methanol as a polymerization solvent is considered the most industrially advantageous in view of a saponification step and solvent recovery step.

When a vinyl ester monomer is polymerized in a methanol solution to produce a PVA having a low degree of polymerization, it is common practice to decrease the concentration of the vinyl ester monomer in the polymerization system and increase the concentration of the vinyl ester polymer, namely to increase the polymerization yield. However, the reaction time needs to be lengthened to decrease the concentration of the vinyl ester monomer and increase the polymerization yield. The lengthened reaction time leads to a significant decrease in productivity, which is very problematic from an industrial point of view.

To overcome such a disadvantage, a method has been reported in which a mercaptan is added to a polymerization system to significantly decrease the degree of polymerization (Patent Literature 1).

However, the method requires a new solvent recovery facility, has the problem of the influence of the mercaptan on the physical properties of the resultant PVA, and requires a new step of removing and recovering an unreacted auxiliary agent. Additionally, there is room for improvement in that the polymerization yield is less than 60% when the polymerization time is 5 hours.

Therefore, from the viewpoint of industrial production, a method for obtaining a vinyl alcohol polymer having a low degree of polymerization under an industrially advantageous condition has been proposed (Patent Literatures 2 and 3).

According to the production method in Patent Literature 2, no mercaptans are used so as to avoid introduction thereof in a recovered solvent and odor emission from the resultant PVA, and instead allylsulfonic acid, methallylsulfonic acid, or a salt thereof is used. The production method in Patent Literature 3 is characterized by performing polymerization by heating under pressure.

However, these methods still leave room for improvement in terms of practical use as methods for industrially producing vinyl alcohol polymers having a low degree of polymerization.

As another method for producing vinyl alcohol polymers having a low degree of polymerization, Patent Literature 4 discloses a vinyl alcohol polymer production method in which a vinyl ester monomer is polymerized in the presence of a polymerization initiator and chain transfer agent having an aliphatic hydrocarbon group having 6 to 12 carbon atoms to obtain a vinyl ester polymer, which is subsequently saponified in the presence of an acidic catalyst.

However, the production method in Patent Literature 4 has a problem in that the saponification reaction requires a long period of time because of a low concentration of the vinyl ester polymer at the time of the saponification. Additionally, in Patent Literature 4, the stability of an aqueous liquid is evaluated in a period of time as short as 1 day. Thus, there is still room for improvement from the viewpoint of industrial practicality.

CITATION LIST

Patent Literature

Patent Literature 1: JP 557-28121 A
Patent Literature 2: JP H09-202812 A
Patent Literature 3: JP 2001-261711 A
Patent Literature 4: WO 2015/019614 A1

SUMMARY OF INVENTION

Technical Problem

The present invention aims to provide an industrially advantageous method for producing vinyl alcohol polymers having a low degree of polymerization using a chain transfer agent having an aliphatic hydrocarbon group having 6 to 12 carbon atoms, the method being capable of producing a vinyl alcohol polymer whose aqueous solution has excellent viscosity stability. Another object of the present invention is to provide an industrially advantageous method for producing vinyl alcohol polymers having a low degree of polymerization using an alkylthiol having 6 to 12 carbon atoms, the method being capable of producing a vinyl alcohol polymer whose aqueous solution has excellent viscosity stability and reducing a mercaptan odor of the vinyl alcohol polymer despite the use of the alkylthiol.

Solution to Problem

The inventor of the present invention has found that the above objects can be achieved by a method for producing vinyl alcohol polymers, in which a vinyl ester monomer (a) is polymerized in the presence of a polymerization initiator (B) and chain transfer agent (C) having an aliphatic hydrocarbon group having 6 to 12 carbon atoms to obtain a vinyl ester polymer (A) and then the vinyl ester polymer (A) at a concentration of 40 mass % or more and 75 mass % or less is saponified in the presence of an acidic catalyst (D). Thus the inventor has completed the present invention.

That is, the present invention provides the following.
[1] A method for producing vinyl alcohol polymers, including: process of polymerizing a vinyl ester monomer (a) in the presence of a polymerization initiator (B) and a chain transfer agent (C) having an aliphatic hydrocarbon group having 6 to 12 carbon atoms to obtain a vinyl ester polymer (A); and process of saponifying the vinyl ester polymer (A) at a concentration of 40 mass % or more and 75 mass % or less in the presence of an acidic catalyst (D) to obtain a vinyl alcohol polymer,
wherein the vinyl alcohol polymer has a viscosity-average degree of polymerization of 160 or more and 400 or less.

[2] The method for producing vinyl alcohol polymers according to [1], wherein a polymerization conversion of the vinyl ester monomer (a) reaches 79.0% or more within 180 minutes.
[3] The method for producing vinyl alcohol polymers according to [1] or [2], wherein the chain transfer agent (C) is an alkylthiol having 6 to 12 carbon atoms.
[4] The method for producing vinyl alcohol polymers according to any one of [1] to [3], wherein the polymerization initiator (B) is an azo polymerization initiator whose a 10-hour half-life temperature is 66° C. or less or a peroxide polymerization initiator whose a 10-hour half-life temperature is 66° C. or less.
[5] The method for producing vinyl alcohol polymers according to any one of [1] to [4], wherein the vinyl alcohol polymer has a degree of saponification of 35 mol % or more and 65 mol % or less.
[6] The method for producing vinyl alcohol polymers according to any one of [1] to [5], wherein the vinyl alcohol polymer has a viscosity-average degree of polymerization of 160 or more and 300 or less.

Advantageous Effects of Invention

According to the present invention, a vinyl alcohol polymer having a low degree of polymerization can be produced industrially advantageously using a chain transfer agent having an aliphatic hydrocarbon group having 6 to 12 carbon atoms. Moreover, an aqueous solution of the vinyl alcohol polymer obtained by the production method of the present invention is excellent in viscosity stability. Furthermore, according to the present invention, a vinyl alcohol polymer having a low degree of polymerization and having a reduced mercaptan odor can be produced industrially advantageously even with the use of an alkylthiol having 6 to 12 carbon atoms.

DESCRIPTION OF EMBODIMENTS

The present invention relates to a method for producing vinyl alcohol polymers including: polymerizing a vinyl ester monomer (a) in the presence of a polymerization initiator (B) and a chain transfer agent (C) having an aliphatic hydrocarbon group having 6 to 12 carbon atoms to obtain a vinyl ester polymer (A); and saponifying the vinyl ester polymer (A) at a concentration of 40 mass % or more and 75 mass % or less in the presence of an acidic catalyst (D) to obtain a vinyl alcohol polymer, wherein the vinyl alcohol polymer has a viscosity-average degree of polymerization of 160 or more and 400 or less. In the present specification, the upper limits and lower limits of value ranges (ranges of, for example, the contents of components, values calculated for components, and values of physical properties) can be combined appropriately.

In the present invention, first, a vinyl ester polymer (A) is obtained by a step of polymerizing a vinyl ester monomer (a) in the presence of a polymerization initiator (B) and a chain transfer agent (C) having an aliphatic hydrocarbon group having 6 to 12 carbon atoms (this step may be hereinafter referred to as "polymerization step").

Examples of the vinyl ester monomer (a) include vinyl formate, vinyl acetate, vinyl propionate, vinyl butyrate, vinyl isobutyrate, vinyl pivalate, vinyl versatate, vinyl cinnamate, vinyl crotonate, vinyl decanoate, vinyl hexanoate, vinyl octanoate, vinyl isononanoate, vinyl trimethylacetate, vinyl 4-tert-butylbenzoate, vinyl 2-ethylhexanoate, vinyl caproate, vinyl caprylate, vinyl laurate, vinyl palmitate, vinyl stearate, vinyl oleate, and vinyl benzoate. Vinyl acetate is particularly preferred from an industrial point of view. One of these may be used alone, or two or more of these may be used in combination.

The polymerization initiator (B) for use in the polymerization is not particularly limited, and selected from among well-known polymerization initiators such as an azo polymerization initiator, a peroxide polymerization initiator, and a redox polymerization initiator depending on the polymerization method used. Examples of the azo polymerization initiator include 2,2'-azobis(isobutyronitrile) (AIBN), 2,2'-azobis(4-methoxy-2,4-dimethylvaleronitrile) (AMV), and 2,2'-azobis(2,4-dimethylvaleronitrile). Examples of the peroxide polymerization initiator include: percarbonate compounds such as diisopropyl peroxydicarbonate, di(2-ethylhexyl) peroxydicarbonate, and diethoxyethyl peroxydicarbonate; perester compounds such as t-butyl peroxyneodecanoate and α-cumyl peroxyneodecanoate; acetylcyclohexylsulfonyl peroxide; and 2,4,4-trimethylpentyl-2-peroxyphenoxyacetate. A combination of any of these polymerization initiators with potassium persulfate, ammonium persulfate, hydrogen peroxide, or the like may be used as a polymerization initiator. One of these polymerization initiators (B) may be used alone, or two or more of these polymerization initiators (B) may be used in combination. The polymerization initiator (B) is preferably an azo polymerization initiator whose a 10-hour half-life temperature of 66° C. or less or a peroxide polymerization initiator whose a 10-hour half-life temperature of 66° C. or less because in this case the polymerization rate can be increased and a high polymerization conversion can be achieved in a short period of time. Examples of the azo polymerization initiator whose a 10-hour half-life temperature of 66° C. or less and peroxide polymerization initiator whose a 10-hour half-life temperature of 66° C. or less include AIBN, AMV, 2,2'-azobis(2,4-dimethylvaleronitrile), and di-2-ethylhexyl peroxydicarbonate.

The amount of the polymerization initiator (B) used is not particularly limited. In a typical case, the amount of the polymerization initiator (B) used is preferably 0.1 to 20 parts by mass, more preferably 0.2 to 10 parts by mass, and even more preferably 0.3 to 5.0 parts by mass with respect to 100 parts by mass of the vinyl ester monomer (a). The polymerization initiator (B) may be added all at once at the initiation of the polymerization, or a portion of the polymerization initiator may be added at the initiation of the polymerization and the rest may be added later during the polymerization.

Examples of the chain transfer agent (C) having an aliphatic hydrocarbon group having 6 to 12 carbon atoms include alcohols having an aliphatic hydrocarbon group having 6 to 12 carbon atoms, aldehydes having an aliphatic hydrocarbon group having 6 to 12 carbon atoms, and thiols having an aliphatic hydrocarbon group having 6 to 12 carbon atoms. With the use of such a chain transfer agent (C), a vinyl alcohol polymer obtained by the production method of the present invention has an aliphatic hydrocarbon group having 6 to 12 carbon atoms at a terminal. The structure of the aliphatic hydrocarbon group having 6 to 12 carbon atoms is not particularly limited, and may be linear, branched, or cyclic. Examples of the aliphatic hydrocarbon group include saturated aliphatic hydrocarbon groups (alkyl groups), aliphatic hydrocarbon groups having a double bond (alkenyl groups), and aliphatic hydrocarbon groups having a triple bond (alkynyl groups). The aliphatic hydrocarbon group is preferably an alkyl group and more preferably a linear alkyl group or branched alkyl group. If the chain transfer agent (C) has less than 6 carbon atoms, the boiling point of the chain transfer agent is so low that it is difficult to separate the chain transfer agent from other materials (a vinyl ester monomer such as vinyl acetate and a solvent such as methanol) in a recovery step involved in the production of the vinyl alcohol polymer. Moreover, if the chain transfer agent (C) has less than 6 carbon atoms and the resultant vinyl alcohol polymer is used for suspension polymerization as a dispersant to produce vinyl resin particles from a vinyl compound, it is difficult to remove a monomer component such as the vinyl compound from the vinyl resin particles and the plasticizer absorbency of the vinyl resin particles is decreased. If the chain transfer agent (C) has more than 12 carbon atoms, there is a decrease in solubility in a solvent, such as methanol, suitably used in the process of polymerizing the vinyl ester monomer (a). In the operation of dissolving the chain transfer agent in the solvent such as methanol and consecutively adding the resultant solution during the polymerization, a decreased solubility of the chain transfer agent results in a phenomenon such as precipitation of the chain transfer agent, which makes the addition difficult. Besides, the addition of the solution containing the chain transfer agent not fully dissolved leads to an uneven polymerization reaction. Thus, the use of the chain transfer agent (C) having more than 12 carbon atoms complicates an operation involved in the production process and causes problems with quality control of the resultant vinyl alcohol polymer product. Additionally, if a vinyl alcohol polymer produced using the chain transfer agent (C) having more than 12 carbon atoms is used as a dispersion stabilizer for suspension polymerization of a vinyl compound, it is difficult to remove a monomer component from the resultant vinyl resin particles.

The chain transfer agent (C) is preferably an alkylthiol having 6 to 12 carbon atoms, more preferably an alkylthiol having 6 to 10 carbon atoms, and even more preferably an alkylthiol having 6 to 8 carbon atoms. Examples of the alkylthiol having 6 to 12 carbon atoms include 1-hexanethiol (n-hexyl mercaptan), cyclohexanethiol (cyclohexyl mercaptan), 1-adamantanethiol (1-mercaptoadamantane), 1-heptanethiol (n-heptyl mercaptan), 1-octanethiol(n-octyl mercaptan), 1-nonanethiol (n-nonyl mercaptan), 1-decanethiol(n-decyl mercaptan), 1-undecanethiol (n-undecyl mercaptan), 1-dodecanethiol (n-dodecyl mercaptan), and tert-dodecanethiol (tert-dodecyl mercaptan). One of these may be used alone, or two or more of these may be used in combination.

The amount of the chain transfer agent (C) used may be determined according to the chain transfer constant of the chain transfer agent used and intended degree of polymerization of the vinyl ester polymer (A). In view of the degree of polymerization of the resultant vinyl alcohol polymer and viscosity stability of an aqueous solution of the vinyl alcohol polymer, the amount of the chain transfer agent (C) used is preferably 0.015 mol % or more and 0.10 mol % or less with respect to the vinyl ester monomer (a).

For the purpose of, for example, adjusting the degree of polymerization of the resultant vinyl ester polymer (A), another chain transfer agent (C') different from the chain transfer agent (C) may be allowed to be present during the polymerization as long as the intended effect of the present invention is not impaired. Examples of the other chain transfer agent (C') include: aldehydes such as acetaldehyde and propionaldehyde; ketones such as acetone and methyl ethyl ketone; halogenated hydrocarbons such as trichloroethylene and perchloroethylene; and phosphinic acid salts such as sodium phosphinate monohydrate. Among these, aldehydes and ketones are suitably used. The amount of the chain transfer agent (C') to be added may be determined depending on the chain transfer constant of the chain transfer agent (C) to be added and on the intended degree of polymerization of the vinyl ester polymer (A) as long as the effect of the present invention is not impaired.

The polymerization technique employed for the above polymerization may be batch polymerization, semi-batch polymerization, continuous polymerization, or semi-continuous polymerization. As a polymerization method, any known polymerization method such as bulk polymerization, solution polymerization, suspension polymerization, or emulsion polymerization can be employed. Among these, bulk polymerization in which polymerization is performed in the absence of a solvent and solution polymerization in which polymerization is performed in the presence of a solvent are suitable. Examples of the solvent used in the polymerization (for example, solution polymerization) include, but are not limited to, alcohol solvents such as methanol, ethanol, and n-propanol. One of the solvents may be used alone, or two or more of the solvents may be used in combination. The amount of the solvent (for example, an alcohol solvent) used is not particularly limited. In a typical case, the amount of the solvent used is preferably 10 to 150 parts by mass, more preferably 20 to 120 parts by mass, even more preferably 30 to 90 parts by mass, and particularly preferably 30 to 80 parts by mass with respect to 100 parts by mass of the vinyl ester monomer (a) in terms of improvement in the efficiency of the polymerization.

The polymerization temperature at which the vinyl ester monomer (a) is polymerized in the presence of the polymerization initiator (B) and chain transfer agent (C) is not particularly limited. In a typical case, the polymerization temperature is preferably 0° C. or more and 200° C. or less, more preferably 30° C. or more and 140° C. or less, even more preferably 30° C. or more and 100° C. or less, and particularly preferably 30° C. or more and 90° C. or less. If the polymerization temperature is less than 0° C., the polymerization rate is likely to be insufficient. If the polymerization temperature is more than 200° C., the intended polymer is likely to be unobtainable. Examples of a method for controlling the polymerization temperature to 0° C. or more and 200° C. or less include: a method in which the polymerization rate is controlled to balance the heat generated by the polymerization with the heat released from the surface of a reactor; and a method in which an external jacket including a proper heat medium is used for the control. The latter method is preferred from a safety standpoint. The pressure during the polymerization is not particularly limited. The polymerization may be performed under pressure if necessary or may be performed at atmospheric pressure.

In the production method of the present invention, a polymerization conversion of the vinyl ester monomer (a) reaches 79.0% or more preferably within 180 minutes and more preferably within 150 minutes in the polymerization of the vinyl ester monomer (a) in the polymerization step because when such a condition is satisfied as well as saponification conditions described later, excellent industrial practicality of the vinyl alcohol polymer production can be achieved. In the polymerization of the vinyl ester monomer (a), a polymerization conversion of 80.0% or more is reached preferably within 180 minutes and more preferably within 150 minutes. To achieve the polymerization conversion, the amounts of the polymerization initiator (B) used and chain transfer agent (C) used can be adjusted appropriately.

Next, a vinyl alcohol polymer is obtained by a step of saponifying the vinyl ester polymer (A) obtained in the above polymerization step and at a concentration of 40 mass % or more and 75 mass % or less in the presence of an acidic catalyst (D) (this step will be hereinafter referred to as "saponification step").

Examples of the acidic catalyst (D) include: inorganic acids such as hydrochloric acid, sulfuric acid, and nitric acid; organic acids such as formic acid, acetic acid, oxalic acid, and p-toluenesulfonic acid; salts such as pyridinium p-toluenesulfonate and ammonium chloride; and Lewis acids such as zinc chloride, aluminum chloride, iron trichloride, tin dichloride, tin tetrachloride, and boron trifluoride-diethyl ether complex. One of these may be used alone, or two or more of these may be used in combination. The amount of the acidic catalyst (D) used is preferably 0.001 to 0.1 molar equivalents, more preferably 0.005 to 0.08 molar equivalents, and even more preferably 0.01 to 0.05 molar equivalents with respect to the vinyl ester monomer (a)-derived unit in the vinyl ester polymer (A). Examples of the solvent used in the saponification step include: organic solvents such as alcohols such as methanol and ethanol, esters such as methyl acetate and ethyl acetate, ketones such as acetone and methyl ethyl ketone, and aromatic hydrocarbons such as benzene and toluene; and water. One of these may be used alone, or two or more of these may be used in combination. For example, the solvent may be a mixture of an organic solvent and water. In particular, the solvent is preferably an alcohol or a mixture of an alcohol and water and more preferably methanol or a mixture of methanol and water. When the saponification is performed using a mixture of methanol and water as the solvent, the water content of a saponification solution is preferably 5.0% or less, more preferably 3.0% or less, even more preferably 1.0% or less, and particularly preferably 0.8% or less.

The saponification solution containing the vinyl ester polymer (A), acidic catalyst (D), and solvent has a concentration of the vinyl ester polymer (A) of 40 mass % or more and 75 mass % or less, preferably 45 mass % or more and 70 mass % or less, more preferably 45 mass % or more and 65 mass % or less, even more preferably 45 mass % or more and 60 mass % or less, and particularly preferably 45 mass % or more and 58 mass % or less. If the concentration is less than 40 mass %, the saponification step requires a long period of time, which is disadvantage from the viewpoint of industrial practicality. If the concentration is more than 75 mass %, stirring operation is difficult to perform and the progress of the saponification tends to be impeded.

The temperature in the saponification step is not particularly limited. In a typical case, the temperature in the saponification step is preferably 10° C. to 100° C. and more preferably 20° C. to 80° C. The saponification reaction time is not particularly limited and typically about 30 minutes to 2.5 hours.

In the production method of the present invention, the time required for a degree of saponification of 55 mol % to be reached is preferably 150 minutes or less, more preferably 135 minutes or less, even more preferably 130 minutes or less, and particularly preferably 125 minutes or less from the viewpoint of industrial practicality.

The degree of saponification of the vinyl alcohol polymer (hereinafter referred to as "PVA (X)") obtained by the production method of the present invention is preferably, but not particularly limited to, 35 mol % or more and 65 mol % or less in terms of the PVA (X) as a dispersion stabilizer. The degree of saponification of the PVA (X) is more preferably 40 mol % or more, even more preferably 44 mol % or more, and particularly preferably 47 mol % or more. The degree of saponification of the PVA (X) is more preferably 63 mol % or less, even more preferably 61 mol % or less, particularly preferably less than 60 mol %, and most preferably 58 mol % or less.

The degree of saponification of the PVA (X) obtained by the production method of the present invention can be determined from a ratio, determined by $^1$H-NMR measurement, between the hydroxy group of the vinyl alcohol unit and the residual ester group of the vinyl ester monomer unit. The degree of saponification of the PVA (X) can be determined also by the method specified in JIS K 6726 (1994) The method specified in JIS K 6726 (1994) can also be used to determine the degree of saponification of the PVA (X).

The PVA (X) obtained by the production method of the present invention has a viscosity-average degree of polymerization of 160 or more and 400 or less, preferably 160 or more and 320 or less, more preferably 160 or more and 300 or less, even more preferably 160 or more and 290 or less, and particularly preferably 160 or more and 250 or less. The viscosity-average degree of polymerization (which may be hereinafter abbreviated as "degree of polymerization") is measured according to JIS K 6726 (1994). That is, the vinyl alcohol polymer is re-saponified to a degree of saponification of 99.5 mol % or more, then purified, and then subjected to measurement of a limiting viscosity [η] (liter/g) at 30° C. in water, from which the degree of polymerization is determined by the following equation.

$$P=([\eta]\times 10000/8.29)^{(1/0.62)}$$

In a preferred embodiment, the PVA (X) obtained by the production method of the present invention has a viscosity-average degree of polymerization of 160 or more and 400 or less, and the viscosity of a 40 mass % aqueous solution of the PVA (X) is 900 mPa·s or more and 5000 mPa·s or less. In another preferred embodiment, the PVA (X) has a viscosity-average degree of polymerization of 160 or more and 320 or less, and the viscosity of a 40 mass % aqueous solution of the PVA (X) is 900 mPa·s or more and 4000 mPa·s or less. In yet another preferred embodiment, the PVA (X) has a viscosity-average degree of polymerization of 160 or more and 300 or less, and the viscosity of a 40 mass % aqueous solution of the PVA (X) is 1000 mPa·s or more and 3000 mPa·s or less. In particularly preferred embodiment, the PVA (X) has a viscosity-average degree of polymerization of 160 or more and 290 or less, and the viscosity of a 40 mass % aqueous solution of the PVA (X) is 1000 mPa·s or more and 2000 mPa·s or less. In any of the above embodiments, the values of the properties (such as the degree of saponification) of the PVA (X) can be appropriately changed and combined.

The PVA (X) obtained by the production method of the present invention can be suitably used, for example, as a dispersion stabilizer for suspension polymerization of a vinyl compound (such as vinyl chloride). A dispersion stabilizer for suspension polymerization that contains PVA (X) is excellent in handleability and provides the following effects. (1) A vinyl resin having high plasticizer absorbency and easily processable can be obtained. (2) A residual monomer component can be easily removed from the obtained vinyl resin. (3) Formation of coarse particles in the obtained vinyl resin is reduced.

Such a dispersion stabilizer for suspension polymerization is preferably in the form of a liquid containing water, namely an aqueous liquid. It is important that the aqueous liquid have a concentration of the PVA (X) of 20 mass % or more and 50 mass % or less. If the concentration of the PVA (X) is less than 20 mass %, economic efficiency decreases, or the aqueous liquid has a decreased stability which is likely to result in precipitation or the like. The concentration of the PVA (X) is preferably 26 mass % or more and more preferably 31 mass % or more. If the concentration is more than 50 mass %, the handleability decreases due to an increase in viscosity. The term "aqueous liquid" in the present invention refers to an aqueous solution or aqueous dispersion. The term "aqueous dispersion" refers to a mixture in which a component other than water is uniformly dispersed in water without precipitation or phase-separation.

The method for preparing an aqueous liquid having a concentration of the PVA (X) of 20 mass % or more and 50 mass % or less is not particularly limited. Examples of the applicable methods include: a method in which the saponification of the vinyl ester polymer (A) is followed by drying of the PVA (X) obtained, to which water is added to dissolve or disperse the PVA (X); and a method in which, after the saponification, the saponification solvent is replaced with water, for example, by supply of steam or by addition of water followed by heating. In the preparation of the aqueous liquid of the PVA (X), a small amount of a surfactant such as a nonionic, cationic, or anionic surfactant may be added as long as the intended effect of the present invention is not impaired.

The viscosity of a 40 mass % (the solid content concentration of the vinyl alcohol polymer) aqueous liquid serving as the dispersant for suspension polymerization is preferably 5000 mPa·s or less, more preferably 4000 mPa·s or less, even more preferably 3000 mPa·s or less, and particularly preferably 2000 mPa·s or less at 25° C. in view of handleability. The viscosity of the 40 mass % aqueous liquid serving as the dispersant for suspension polymerization is preferably 900 mPa·s or more, more preferably 1000 mPa·s or more, and even more preferably 2000 mPa·s or more at 25° C. The viscosity may be, for example, 900 mPa·s or more and 5000 mPa·s or less, 900 mPa·s or more and 4000 mPa·s or less, 1000 mPa·s or more and 3000 mPa·s or less, or 1000 mPa·s or more and 2000 mPa·s or less. The viscosity of the aqueous liquid can be measured using a B-type rotational viscometer.

[PVA (Y)]

The PVA (X)-containing dispersion stabilizer for suspension polymerization preferably further contains, in addition to the PVA (X), a vinyl alcohol polymer (hereinafter referred to as "PVA (Y)") having a degree of saponification of more than 65 mol % and a viscosity-average degree of polymerization of more than 480. When the PVA (Y) having a higher degree of saponification and viscosity-average degree of polymerization than those of the PVA (X) is further contained, the polymerization stability is further improved and particle coarsening can be effectively prevented.

The PVA (Y) has a degree of saponification of more than 65 mol %, preferably more than 65 mol % and 95 mol % or less, and more preferably 68 mol % or more and 90 mol % or less. If the PVA (Y) has a degree of saponification of 65 mol % or less, the PVA (Y) tends to have a decreased stability leading to deteriorated handleability. Moreover, the polymerization tends to be so unstable that the resultant vinyl resin particles are coarse. The degree of saponification of the PVA (Y) can be measured according to JIS K 6726 (1994).

The PVA (Y) has a viscosity-average degree of polymerization of more than 480, preferably 500 or more and 8000 or less, and more preferably 600 or more and 3500 or less. If the PVA (Y) has a viscosity-average degree of polymerization of 480 or less, the polymerization stability during the suspension polymerization of the vinyl compound tends to decrease. The viscosity-average degree of polymerization of the PVA (Y) can be determined in the same manner as described above for the PVA (X).

One PVA (Y) may be used alone, or two or more PVAs (Y) may be used in combination.

The mass ratio [PVA (X)]/[PVA (Y)] of solids of the PVA (X) used to solids of the PVA (Y) used is preferably 10/90 to 55/45 and more preferably 15/85 to 50/50. If the solids ratio is less than 10/90, it may be difficult to remove the monomer component from the vinyl resin particles obtained by the suspension polymerization of the vinyl compound, or the performance of the dispersion stabilizer may decrease and, for example, the plasticizer absorbency of the resultant vinyl resin particles may decrease. If the solids ratio is more than 55/45, the polymerization stability during the suspension polymerization of the vinyl compound decreases, and the decreased polymerization stability may cause problems such as coarsening of the vinyl resin particles obtained by the suspension polymerization and a failure to obtain particles having uniform particle diameters.

When the dispersion stabilizer for suspension polymerization contains the PVA (Y), the dispersion stabilizer for suspension polymerization may be a product composed of the aqueous PVA (X) liquid to which the PVA (Y) in a solid form or an aqueous liquid form is added or a product composed of the aqueous PVA (X) liquid and the PVA (Y) in a solid form or an aqueous liquid form which are separately packaged.

[Other Components]

The dispersion stabilizer for suspension polymerization may contain additional PVA other than the PVA (X) and PVA (Y) as long as the intended effect of the present invention is not impaired. For example, the dispersion stabilizer for suspension polymerization may contain a PVA having a degree of saponification of 35 mol % or more and 65 mol % or less and a viscosity-average degree of polymerization of 160 or more and 400 or less and containing no aliphatic hydrocarbon group having 6 to 12 carbon atoms at a terminal. Such a PVA can be produced during the synthesis of the PVA (X) upon a failure of the aliphatic hydrocarbon group of the chain transfer agent to be introduced at the terminal.

The dispersion stabilizer for suspension polymerization may contain various additives as long as the intended effect of the present invention is not impaired. Examples of the additives include polymerization regulators such as aldehydes, halogenated hydrocarbons, and mercaptans; polymerization inhibitors such as phenol compounds, sulfur compounds, and N-oxide compounds; pH adjusters; crosslinking agents; preservatives; antifungal agents; antiblocking agents; antifoaming agents; and compatibilizing agents.

[Application (Method for Producing Vinyl Resin)]

The dispersion stabilizer for suspension polymerization is used for suspension polymerization of a vinyl compound. Another embodiment of the present invention is a method for producing a vinyl resin, including performing suspension polymerization of a vinyl compound in the presence of the dispersion stabilizer for suspension polymerization. Specifically, the method for producing a vinyl resin includes: polymerizing a vinyl ester monomer (a) in the presence of a polymerization initiator (B) and a chain transfer agent (C) having an aliphatic hydrocarbon group having 6 to 12 carbon atoms to obtain a vinyl ester polymer (A); saponifying the vinyl ester polymer (A) at a concentration of 40 mass % or more and 75 mass % or less in the presence of an acidic catalyst (D) to obtain a PVA (X); preparing an aqueous liquid having a concentration of the PVA (X) of 20 mass % or more and 50 mass % or less as a dispersion stabilizer for suspension polymerization; and suspension-polymerizing a vinyl compound in the presence of the dispersion stabilizer for suspension polymerization to obtain a vinyl resin, wherein the PVA (X) has a viscosity-average degree of polymerization of 160 or more and 400 or less.

Examples of the vinyl compound subjected to the suspension polymerization include: vinyl halides such as vinyl chloride; vinyl esters such as vinyl acetate and vinyl propionate; (meth)acrylic acid, esters thereof, and salts thereof; maleic acid, fumaric acid, esters thereof, and anhydrides thereof, styrene; acrylonitrile; vinylidene chloride; and vinyl ether. Among these, vinyl chloride is preferred. A combination of vinyl chloride and a monomer copolymerizable with vinyl chloride is also preferred. Examples of the monomer copolymerizable with vinyl chloride include: vinyl esters such as vinyl acetate and vinyl propionate; (meth)acrylic acid esters such as methyl (meth)acrylate and ethyl (meth)acrylate; α-olefins such as ethylene and propylene; unsaturated dicarboxylic acids such as maleic anhydride and itaconic acid; acrylonitrile; styrene; vinylidene chloride; and vinyl ether. In the present invention, the expression "(meth) acryl" is used to include both "methacryl" and "acryl".

In the suspension polymerization of the vinyl compound, the polymerization temperature is not particularly limited, and can be adjusted to about 20° C. to more than 90° C. In order to increase the efficiency in removing heat from the polymerization reaction system, it is preferable, for example, to carry out the suspension polymerization using a polymerizer with a reflux condenser.

When the vinyl resin is produced using the dispersion stabilizer for suspension polymerization, the dispersion stabilizer exhibits a significant effect on removal of the monomer component from the resultant vinyl resin regardless of the polymerization temperature. This effect is exhibited not only when the dispersion stabilizer for suspension polymerization is used in suspension polymerization at a polymerization temperature less than 60° C., at which the residual monomer component can be relatively easily removed, but also when the dispersion stabilizer for suspension polymerization is used in suspension polymerization at a polymerization temperature of 60° C. or more, at which the residual monomer component in the vinyl resin is not easily removed. The benefit of this effect is more evident in the latter case.

In the suspension polymerization of the vinyl compound, any of the following materials commonly used for suspension polymerization of a vinyl compound in an aqueous medium may be used in combination with the dispersion stabilizer for suspension polymerization: water-soluble cellulose ethers such as methylcellulose, hydroxyethyl cellulose, hydroxypropyl cellulose, and hydroxypropyl methylcellulose; water-soluble polymers such as gelatin; oil-soluble emulsifiers such as sorbitan monolaurate, sorbitan trioleate, glycerin tristearate, and ethylene oxide-propylene oxide block copolymer; and water-soluble emulsifiers such as polyoxyethylene sorbitan monolaurate, polyoxyethylene glycerin oleate, and sodium laurate. The amount of such a material to be added is not particularly limited. In a typical case, the amount of such a material to be added is preferably 0.01 parts by mass or more and 1.0 parts by mass or less with respect to 100 parts by mass of the vinyl compound.

In the suspension polymerization of the vinyl compound, a method for adding the dispersion stabilizer for suspension polymerization to a polymerization vessel is not particularly limited. For example, when the dispersion stabilizer for suspension polymerization contains the PVA (Y), the PVA (X) and PVA (Y) may be added as a mixture. The PVA (X) and PVA (Y) may be added separately. For example, the PVA (X) and PVA (Y) may be added individually before the initiation of the polymerization or may be added before the initiation of the polymerization and after the initiation of the polymerization, respectively.

In view of handleability and environmental impact, the addition of the dispersion stabilizer for suspension polymerization to a polymerization vessel is done without the use of an organic solvent such as methanol; that is, the dispersion stabilizer is added as it is or after diluted with water. The PVA (Y) is preferably added as an aqueous solution or aqueous dispersion.

In the suspension polymerization of the vinyl compound, the mass ratio of the vinyl compound to water is not particularly limited. The lower the ratio of the vinyl compound to water is, the more stable the polymerization becomes, but the lower the productivity becomes. The higher the ratio of the vinyl compound to water is, the higher the productivity becomes, but the less stable the polymerization becomes. The mass ratio of the vinyl compound to water (vinyl compound/water) is typically 4/7 to 5/4. A vinyl compound/water mass ratio smaller than 4/7 results in low productivity in producing a vinyl resin. A vinyl compound/water mass ratio larger than 5/4, on the other hand, results in very unstable polymerization and tends to cause particle coarsening of vinyl resin particles formed. Thus such ratios are not preferred. However, when the dispersion stabilizer for suspension polymerization containing the PVA (X) obtained by the production method of the present invention is used, the polymerization can proceed stably even under a condition where the ratio of the vinyl compound to water is high and the polymerization is likely to be unstable, specifically, under a polymerization condition where the vinyl compound/water mass ratio is larger than 3/4. Therefore, in terms of more effective prevention of particle coarsening of the resultant vinyl resin particles, the vinyl compound/water mass ratio is preferably larger than 3/4. Meanwhile, the vinyl compound/water mass ratio is preferably smaller than 10/9.

The dispersion stabilizer for suspension polymerization, which is in the form of a low-viscosity and high-concentrated aqueous liquid, is excellent in handleability. Since no organic solvent such as methanol is involved, the dispersion stabilizer for suspension polymerization of the present invention has little environmental impact and is also excellent in economic efficiency. When suspension polymerization of a vinyl compound is performed in the presence of the dispersion stabilizer for suspension polymerization of the present invention, the polymerization stability is high, which reduces formation of coarse particles and allows production of vinyl resin particles having uniform particle diameters. Moreover, even when the dispersion stabilizer for suspension polymerization of the present invention is used only in a small amount, vinyl resin particles having high plasticizer absorbency and easily processable can be obtained. Furthermore, vinyl resin particles from which a high proportion of a residual vinyl compound is removed per unit time and which is excellent in monomer removability can be obtained. The obtained vinyl resin particles can be mixed with a plasticizer as appropriate for use in various molded articles.

The present invention embraces embodiments in which the above features are combined in various ways within the technical scope of the present invention as long as the embodiments provide the effect of the present invention.

EXAMPLES

Hereinafter, the present invention will be described in more detail by examples. It should be noted that the present invention is not limited in any respect by the following examples and many modifications can be made by those of ordinary skill in the art within the technical concept of the present invention.

Example 1

(1) An amount of 325 parts by mass of vinyl acetate, 0.10 parts by mass of n-octyl mercaptan (OCM) as a chain transfer agent, and 175 parts by mass of methanol were introduced into a reactor equipped with a stirrer, reflux cooling tube, nitrogen feed tube, port for adding a chain transfer agent, and port for adding a polymerization initiator. The reaction system was purged with nitrogen by nitrogen bubbling for 30 minutes. Separately, a methanol solution of n-octyl mercaptan (concentration: 3 mass %) was prepared as a solution (hereinafter referred to as "delay solution") for consecutive addition of the chain transfer agent, and was bubbled with argon for 30 minutes. Temperature increase of the reactor was started and, when the internal temperature reached 60° C., 1.4 parts by mass of 2,2'-azobis(isobutyronitrile) (AIBN) was added to initiate polymerization. While the polymerization reaction was proceeding, the delay solution prepared was continually added dropwise to the reaction system so that the molar ratio between vinyl acetate and OCM was kept constant in the polymerization solution. The polymerization was allowed to proceed at 60° C. and atmospheric pressure for 150 minutes, and at this moment, the addition of the delay solution was stopped and 2.8 parts by mass of AIBN was added. The polymerization conversion at the addition of AIBN was 82.0%. The polymerization was terminated by cooling 330 minutes after the initiation of the polymerization. The polymerization conversion at the termination of the polymerization was 90.7%. Subsequently, the unreacted vinyl acetate monomer was distilled away with addition of methanol at 30° C. and reduced pressure. Thus, a methanol solution of a modified polyvinyl acetate (concentration: 75.0 mass %) having OCM introduced therein was obtained.

(2) Methanol and ion-exchanged water were added to the methanolic modified polyvinyl acetate solution obtained in (1). A methanol solution of p-toluenesulfonic acid (concentration: 20.0 mass %) was further added to the mixture, which was saponified at 65° C. In the saponification reaction, the concentration of the modified polyvinyl acetate in the saponification solution was 50 mass %, the water content of the saponification solution was 0.5 mass %, and the molar ratio of p-toluenesulfonic acid to the vinyl acetate units in the modified polyvinyl acetate was 0.02. The degree of saponification measured according to JIS K 6726 (1994) reached 55 mol % 120 minutes after the addition of the methanol solution of p-toluenesulfonic acid. Thus 1.1 molar equivalents of sodium hydrogen carbonate relative to the p-toluenesulfonic acid was added for neutralization, which was followed by drying in a vacuum dryer at 40° C. for 12 hours. A modified PVA (PVA-1) having OCM introduced at its terminal was obtained in this manner. The time required for a degree of saponification of 55 mol % to be reached, the degree of saponification measured according to JIS K 6726 (1994), and the viscosity-average degree of polymerization measured according to JIS K 6726 (1994) are shown in Table 2. The modified PVA (PVA-1) obtained had no odor.

[Viscosity Stability]

Ion-exchanged water was added to the modified PVA (PVA-1) obtained in (2) to obtain an aqueous solution (aqueous PVA solution) of a dispersion stabilizer for suspension polymerization at a concentration shown in Table 2. The aqueous solution of the dispersion stabilizer for suspension polymerization was left to stand at 25° C. for 1 month, and then the viscosity stability thereof was evaluated according to the following criteria. "A" represents the best viscosity stability. The concentration of the aqueous solution of the dispersion stabilizer for suspension polymerization and the results of evaluating the viscosity and viscosity stability of the aqueous PVA solution are shown in Table 2. The viscosity of the aqueous PVA solution was measured using a B-type rotational viscometer.

A: (Viscosity measured after 1-month standing/Viscosity measured just after preparation of aqueous solution)<1.1

B: 1.1≤(Viscosity measured after 1-month standing/Viscosity measured just after preparation of aqueous solution)<1.3

C: 1.3≤(Viscosity measured after 1-month standing/Viscosity measured just after preparation of aqueous solution)<1.5

D: 1.5≤(Viscosity measured after 1-month standing/Viscosity measured just after preparation of aqueous solution)

Examples 2 to 10

Modified PVAs (PVA-2 to PVA-10) were obtained in the same manner as in Example 1, except that various conditions such as the introduced amounts of vinyl acetate and methanol, type and added amount of the chain transfer agent (C), type and added amount of the polymerization initiator (B), and saponification conditions were changed as shown in Tables 1 and 2. Aqueous solutions of dispersion stabilizers for suspension polymerization were obtained at the same concentration as that in Example 1 as shown in Table 2. The degree of saponification and viscosity-average degree of polymerization of the modified PVAs measured according to JIS K 6726 (1994), concentrations of the aqueous solutions of the dispersion stabilizers for suspension polymerization, and results of evaluating the viscosity and viscosity stability of the 40 mass % aqueous solutions are shown in Table 2. The modified PVAs (PVA-2 to PVA-10) obtained had no odor.

Comparative Examples 1 to 7

PVAs (PVA-11 to PVA-17) were obtained in the same manner as in Example 1, except that the various conditions were changed as shown in Tables 1 and 2. Aqueous solutions of dispersion stabilizers for suspension polymerization were obtained in the same manner as in Example 1. The degree of saponification and viscosity-average degree of polymerization of the modified PVAs measured according to JIS K 6726 (1994), concentrations of the aqueous solutions of the dispersion stabilizers for suspension polymerization, and results of evaluating the viscosity and viscosity stability of the aqueous solutions (40 mass %) are shown in Table 2.

TABLE 1

| | | Polymerization conditions | | | | | | | | Polymerization time & Polymerization conversion | | | |
|---|---|---|---|---|---|---|---|---|---|---|---|---|---|
| | | Monomer (a) | Chain transfer agent (C) | | Methanol | Polymerization initiators (B) | | | | At addition of initiator | | At termination of polymerization | |
| | | | | Introduced amount | | Initial | | Additional | | | | | |
| | PVA | Vinyl acetate (parts by mass) | Type | (parts by mass) | (parts by mass) | Type | Added amount (parts by mass) | Type | Added amount (parts by mass) | Polymerization time (minutes) | Polymerization conversion (mol %) | Polymerization time (minutes) | Polymerization conversion (mol %) |
| Example 1 | PVA-1 | 325 | OCM | 0.10 | 175 | AIBN | 1.4 | AIBN | 2.8 | 150 | 82.0 | 330 | 90.7 |
| Example 2 | PVA-2 | 325 | HEM | 0.083 | 175 | AIBN | 1.4 | AIBN | 2.8 | 150 | 82.0 | 330 | 91.0 |
| Example 3 | PVA-3 | 325 | OCM | 0.11 | 175 | AIBN | 1.4 | — | — | — | — | 150 | 80.6 |
| Example 4 | PVA-4 | 325 | HEM | 0.093 | 175 | AIBN | 1.4 | — | — | — | — | 180 | 80.0 |
| Example 5 | PVA-5 | 325 | OCM | 0.10 | 175 | AIBN | 1.4 | AMV | 1.0 | 150 | 80.0 | 360 | 91.8 |
| Example 6 | PVA-6 | 325 | HEM | 0.082 | 175 | AIBN | 1.4 | AMV | 1.0 | 180 | 86.2 | 360 | 93.5 |
| Example 7 | PVA-7 | 325 | OCM | 0.10 | 175 | AIBN | 1.4 | AIBN | 2.8 | 150 | 82.0 | 330 | 90.7 |
| Example 8 | PVA-8 | 325 | OCM | 0.20 | 175 | AIBN | 1.4 | — | — | — | — | 150 | 81.2 |
| Example 9 | PVA-9 | 325 | HEM | 0.19 | 175 | AIBN | 1.4 | — | — | — | — | 180 | 81.0 |
| Example 10 | PVA-10 | 325 | HEM | 0.19 | 175 | AIBN | 1.4 | — | — | — | — | 180 | 81.0 |
| Comparative Example 1 | PVA-11 | 325 | — | — | 900 | AIBN | 1.4 | AIBN | 2.8 | 300 | 68.5 | 360 | 72.6 |
| Comparative Example 2 | PVA-12 | 325 | — | — | 1154 | AIBN | 1.4 | — | — | — | — | 360 | 54.4 |
| Comparative Example 3 | PVA-13 | 325 | — | — | 900 | AIBN | 1.4 | AMV | 1.0 | 300 | 68.4 | 360 | 73.8 |
| Comparative Example 4 | PVA-14 | 325 | OCM | 0.10 | 175 | AIBN | 1.4 | AIBN | 2.8 | 150 | 82.0 | 330 | 90.7 |
| Comparative Example 5 | PVA-15 | 325 | OCM | 0.10 | 175 | AIBN | 1.4 | AIBN | 2.8 | 150 | 82.0 | 330 | 90.7 |
| Comparative Example 6 | PVA-16 | 325 | OCM | 0.10 | 175 | AIBN | 1.4 | AIBN | 2.8 | 150 | 82.0 | 330 | 90.7 |
| Comparative Example 7 | PVA-17 | 325 | OCM | 0.073 | 175 | AIBN | 1.4 | — | — | — | — | 180 | 78.9 |

Polymerization Conversion: Polymerization Conversion of vinyl acetate used
OCM: N-octylmercaptan
HEM: N-hexylmercaptan
AIBN: 2,2'-azobis(isobutyronitrile)
AMV: 2,2'-azobis(4-methoxy-2,4-dimethylvaleronitrile)

TABLE 2

| | Physical properties of polymer | | | | | | | Time required for degree of saponification of 55 mol % to be reached (minutes) | Physical properties of aqueous PVA solution | | |
|---|---|---|---|---|---|---|---|---|---|---|---|
| | Saponification conditions | | | | | | Saponification | | | | |
| | Concentration (mass %) | Water content (mass %) | Catalyst | | Degree of polymerization | | ification degree (mol %) | | | | |
| | | | Type | Molar ratio | PVA (X) | | | | Concentration (mass %) | Viscosity (mPa·s) | Viscosity stability |
| Example 1 | 50 | 0.5 | PTSA | 0.02 | PVA-1 | 290 | 55 | 120 | 40 | 4400 | A |
| Example 2 | 50 | 0.5 | H$_2$SO$_4$ | 0.02 | PVA-2 | 300 | 55 | 120 | 40 | 4500 | A |
| Example 3 | 50 | 0.5 | PTSA | 0.02 | PVA-3 | 320 | 55 | 120 | 40 | 4900 | B |
| Example 4 | 50 | 0.5 | PTSA | 0.02 | PVA-4 | 300 | 55 | 120 | 40 | 4500 | B |
| Example 5 | 50 | 0.5 | PTSA | 0.02 | PVA-5 | 300 | 55 | 120 | 40 | 4600 | A |
| Example 6 | 50 | 0.5 | PTSA | 0.02 | PVA-6 | 290 | 55 | 120 | 40 | 4300 | A |
| Example 7 | 45 | 0.5 | H$_2$SO$_4$ | 0.02 | PVA-7 | 290 | 55 | 135 | 40 | 4400 | A |
| Example 8 | 50 | 0.5 | PTSA | 0.02 | PVA-8 | 190 | 55 | 120 | 40 | 1900 | A |
| Example 9 | 50 | 0.5 | PTSA | 0.02 | PVA-9 | 180 | 55 | 120 | 40 | 1800 | A |
| Example 10 | 65 | 0.5 | PTSA | 0.02 | PVA-10 | 180 | 55 | 100 | 40 | 1900 | B |

TABLE 2-continued

| | Saponification conditions | | | | | Sapon- | Time required for degree of saponification of 55 mol | Physical properties of aqueous PVA solution | | |
| --- | --- | --- | --- | --- | --- | --- | --- | --- | --- | --- |
| | Con- | Water | Catalyst | | | Degree of | ification | % to be | | | |
| | centration (mass %) | content (mass %) | Type | Molar ratio | PVA (X) | poly- merization | degree (mol %) | reached (minutes) | Concentration (mass %) | Viscosity (mPa · s) | Viscosity stability |
| Comparative Example 1 | 50 | 0.5 | $H_2SO_4$ | 0.02 | PVA-11 | 300 | 55 | 120 | 40 | 4600 | A |
| Comparative Example 2 | 50 | 0.5 | PTSA | 0.02 | PVA-12 | 190 | 55 | 120 | 40 | 1200 | A |
| Comparative Example 3 | 50 | 0.5 | PTSA | 0.02 | PVA-13 | 210 | 55 | 120 | 40 | 1300 | A |
| Comparative Example 4 | 50 | 0.5 | NaOH | 0.02 | PVA-14 | 200 | 55 | 60 | Insoluble | Not evaluable | Not evaluable |
| Comparative Example 5 | 30 | 0.5 | PTSA | 0.02 | PVA-15 | 290 | 55 | 180 | 40 | 4400 | A |
| Comparative Example 6 | 80 | 0.5 | PTSA | 0.02 | PVA-16 | 290 | 55 | Inoperable due to poor stirring | — | — | — |
| Comparative Example 7 | 50 | 0.5 | PTSA | 0.02 | PVA-17 | 480 | 55 | 120 | 40 | 7000 | D |

Molar ratio: Molar ratio of catalyst to vinyl acetate units in polymer initially introduced
PTSA: P-toluenesulfonic acid The above results have confirmed that the use of the production method of the present invention allows industrially advantageous production of a vinyl alcohol polymer having a degree of polymerization as low as 160 or more and 400 or less and that the vinyl alcohol polymer obtained is excellent in viscosity stability.

Example 11

An amount of 23.5 parts by mass of a 4 mass % aqueous solution of a PVA (Y-1) having a viscosity-average degree of polymerization of 2400 and degree of saponification of 80 mol %, 0.94 parts by mass of the 40 mass % aqueous PVA-1 solution prepared in Example 1, 1206 parts by mass of ion-exchanged water, and 1.07 parts by mass of a 70 mass % toluene solution of di(2-ethylhexyl) peroxydicarbonate were introduced to a 5-L autoclave. A cycle consisting of introducing nitrogen to an internal pressure of the autoclave of 0.2 MPa and discharging the introduced nitrogen was repeated 5 times to thoroughly purge the autoclave with nitrogen. Next, 940 parts by mass of vinyl chloride was introduced. The temperature of the contents of the autoclave was increased to 65° C. and polymerization of the vinyl chloride monomer was initiated under stirring. The internal pressure of the autoclave was 1.03 MPa at the initiation of the polymerization. The internal pressure of the autoclave became 0.70 MPa about 3 hours after the initiation of the polymerization, and at this moment, the polymerization was terminated. After the vinyl chloride monomer remaining unreacted was removed, the polymerization reaction product was taken out and dried at 65° C. for 16 hours to obtain vinyl chloride polymer particles.

(Evaluation of Vinyl Chloride Polymer Particles)
By the methods described hereinafter, the vinyl chloride polymer particles obtained in Example 11 were evaluated for: (1) the average particle diameter; (2) the particle size distribution; (3) the plasticizer absorbency; and (4) the monomer removability. The results are shown in Table 3.
(1) Average Particle Diameter
The particle size distribution was measured using a Tyler standard metal sieve according to dry sieving specified in JIS Z 8815 (1994). The result was plotted as the Rosin-Rammler distribution function to determine the average particle diameter ($d_{p50}$) of the vinyl chloride polymer particles.
(2) Particle Size Distribution
Table 3 shows, in mass %, the content of the vinyl chloride polymer particles (hereinafter referred to as "42 mesh-on") not passed through a sieve having an aperture of 355 μm (calculated as 42 mesh according to the JIS standard for test sieves) and the content of the vinyl chloride polymer particles (hereinafter referred to as "60 mesh-on") not passed through a sieve having an aperture of 250 μm (calculated as 60 mesh according to the JIS standard for test sieves). The contents refer to the contents (%) of cumulative oversize particles. The term "content of the vinyl chloride polymer particles not passed through a sieve having an aperture of 250 μm" refers to the content of the vinyl chloride polymer particles passed through a sieve having an aperture of 355 μm and not passed through a sieve having an aperture of 250 μm. The apertures of the sieves are those according to the nominal aperture size W specified in JIS Z 8801-1 (2006).
For both the content of the 42 mesh-on and the content of the 60 mesh-on, a smaller value indicates that the amount of coarse particles is smaller, the particle size distribution is narrower, and the polymerization stability is higher.

(3) Plasticizer Absorbency

A 5-mL syringe stuffed with 0.02 g of absorbent cotton was measured for mass (A (g)). Subsequently, 0.5 g of the vinyl chloride polymer particles was added to the syringe, which was measured for mass (B (g)). An amount of 1 g of dioctylphthalate (DOP) was further added, and the syringe was left to stand for 15 minutes. Thereafter, the syringe was subjected to centrifugation at 3000 rpm for 40 minutes and measured for mass (C (g)). The plasticizer absorbency (%) was determined by the following equation. Particles having a higher plasticizer absorbency are more easily processable and less likely to cause an appearance defect such as blistering, typically when processed into a sheet.

$$\text{Plasticizer absorbency (\%)} = 100 \times [\{(C-A)/(B-A)\} - 1]$$

(4) Monomer Removability (Proportion of Residual Monomer)

After taken out, the polymerization reaction product resulting from the suspension polymerization of vinyl chloride was dried at 75° C. for 1 hour and 3 hours. The amount of the residual monomer was measured after each time period by headspace gas chromatography, and the proportion of the residual monomer was determined by the following equation: (amount of residual monomer measured after 3-hour drying/amount of residual monomer measured after 1-hour drying)×100. The smaller the determined value is, the larger is the proportion of the residual monomer removed from the vinyl chloride polymer particles by drying in 2 hours, which corresponds to the time period between the end of the 1-hour drying and the end of the 3-hour drying. Therefore, the proportion of the residual monomer is an index representing how easy it is to remove the residual monomer (monomer removability).

Examples 12 to 20 and Comparative Examples 8 to 10

The polymerization of vinyl chloride and evaluation of the resultant vinyl chloride polymer particles were carried out in the same manner as in Example 11, except that the PVA-2 to PVA-10 and PVA-11 to PVA-13 were used instead of PVA-1. The results are shown in Table 3.

The above results lead to the conclusion that when a vinyl alcohol polymer is produced by the production method of the present invention and a dispersion stabilizer for suspension polymerization containing the vinyl alcohol polymer is used for suspension polymerization of a vinyl compound, the polymerization stability is high, which reduces formation of coarse particles and allows production of particles having uniform particle diameters. Moreover, polymer particles excellent in plasticizer absorbency can be obtained, and polymer particles exhibiting very good effect particularly in the monomer removability and allowing efficient removal of a residual monomer can be obtained. Furthermore, the dispersion stabilizer for suspension polymerization is a low-viscosity and high-concentrated aqueous liquid produced with intentional avoidance of the use of any organic solvent such as methanol, has very good handleability, has little environmental impact, and can be produced with high productivity. Such a dispersion stabilizer for suspension polymerization is industrially very useful.

INDUSTRIAL APPLICABILITY

According to the production method of the present invention, an aqueous solution of the resultant vinyl alcohol polymer is excellent in viscosity stability, the time required for production of the vinyl alcohol polymer is short, the amount of a solvent used can be reduced, and a vinyl alcohol polymer having a low degree of polymerization can be produced industrially advantageously. Moreover, according to the production method of the present invention, a vinyl alcohol polymer having a reduced mercaptan odor can be produced even with the use of an alkylthiol having 6 to 12 carbon atoms.

The invention claimed is:

1. A method for producing a vinyl alcohol polymer, the method comprising:
    polymerizing a vinyl ester monomer in the presence of a polymerization initiator and a chain transfer agent having an aliphatic hydrocarbon group having 6 to 12 carbon atoms to obtain a vinyl ester polymer; and

TABLE 3

| | | Result of evaluating vinyl chloride polymer particles | | | | |
|---|---|---|---|---|---|---|
| | | Average particle | Particle size distribution | | Plasticizer | Proportion of residual |
| | PVA (X) | diameter (μm) | 42 mesh-on (mass %) | 60 mesh-on (mass %) | absorbency (%) | monomer (%) |
| Example 11 | PVA-1 | 150.3 | 0.3 | 1.5 | 17.8 | 7.0 |
| Example 12 | PVA-2 | 154.6 | 0.1 | 1.2 | 17.2 | 7.9 |
| Example 13 | PVA-3 | 149.3 | 0 | 0.6 | 18.3 | 6.4 |
| Example 14 | PVA-4 | 148.0 | 0.1 | 0.7 | 18.1 | 6.6 |
| Example 15 | PVA-5 | 154.3 | 0.2 | 1.4 | 17.5 | 7.3 |
| Example 16 | PVA-6 | 151.2 | 0.1 | 1.1 | 17.1 | 8.1 |
| Example 17 | PVA-7 | 151.4 | 0.1 | 0.8 | 17.0 | 8.3 |
| Example 18 | PVA-8 | 155.9 | 0.4 | 1.5 | 18.8 | 6.2 |
| Example 19 | PVA-9 | 154.2 | 0.3 | 1.4 | 18.1 | 6.0 |
| Example 20 | PVA-10 | 158.4 | 0.4 | 1.5 | 17.5 | 6.8 |
| Comparative Example 8 | PVA-11 | 152.2 | 0.3 | 2.1 | 16.8 | 18.6 |
| Comparative Example 9 | PVA-12 | 147.6 | 0.1 | 1.6 | 16.5 | 20.3 |
| Comparative Example 10 | PVA-13 | 157.5 | 0.3 | 1.8 | 16.6 | 19.8 | saponifying the vinyl ester polymer at a concentration of 40 mass % or more and 75 mass % or less in the presence of an acidic catalyst to obtain a vinyl alcohol polymer,
wherein the vinyl alcohol polymer has a viscosity-average degree of polymerization of 160 or more and 400 or less, and
wherein the vinyl alcohol polymer has side groups consisting of hydroxyl and ester side groups.

2. The method according to claim 1,
wherein a polymerization conversion of the vinyl ester monomer reaches 79.0% or more within 180 minutes.

3. The method according to claim 1,
wherein the chain transfer agent is an alkylthiol having 6 to 12 carbon atoms.

4. The method according to claim 1,
wherein the polymerization initiator is an azo polymerization initiator whose a 10-hour half-life temperature is 66° C. or less or a peroxide polymerization initiator whose a 10-hour half-life temperature is 66° C. or less.

5. The method according to claim 1,
wherein the vinyl alcohol polymer has a degree of saponification of 35 mol % or more and 65 mol % or less.

6. The method according to claim 1,
wherein the vinyl alcohol polymer has a viscosity-average degree of polymerization of 160 or more and 300 or less.

7. The method according to claim 1,
wherein the vinyl alcohol polymer has a degree of saponification of 45 mol % or more and 65 mol % or less.

8. A method for producing a vinyl alcohol polymer, the method comprising:
polymerizing a vinyl ester monomer in the presence of a polymerization initiator and a chain transfer agent having an aliphatic hydrocarbon group having 6 to 12 carbon atoms to obtain a vinyl ester polymer; and
saponifying the vinyl ester polymer at a concentration of 40 mass % or more and 75 mass % or less in the presence of an acidic catalyst to obtain a vinyl alcohol polymer,
wherein the vinyl alcohol polymer has a viscosity-average degree of polymerization of 160 or more and 400 or less, and
wherein a portion of the polymerization initiator is present at initiation of the polymerization and another portion is added during the polymerization.

9. The method according to claim 8,
wherein a polymerization conversion of the vinyl ester monomer reaches 79.0% or more within 180 minutes.

10. The method according to claim 8,
wherein the chain transfer agent is an alkylthiol having 6 to 12 carbon atoms.

11. The method according to claim 8,
wherein the polymerization initiator is an azo polymerization initiator whose a 10-hour half-life temperature is 66° C. or less or a peroxide polymerization initiator whose a 10-hour half-life temperature is 66° C. or less.

12. The method according to claim 8,
wherein the vinyl alcohol polymer has a degree of saponification of 35 mol % or more and 65 mol % or less.

13. The method according to claim 8,
wherein the vinyl alcohol polymer has a viscosity-average degree of polymerization of 160 or more and 300 or less.

14. A method for producing a vinyl alcohol polymer, the method comprising:
polymerizing a vinyl ester monomer in the presence of a polymerization initiator and a chain transfer agent having an aliphatic hydrocarbon group having 6 to 12 carbon atoms to obtain a vinyl ester polymer; and
saponifying the vinyl ester polymer at a concentration of 40 mass % or more and 75 mass % or less in the presence of an acidic catalyst to obtain a vinyl alcohol polymer,
wherein the vinyl alcohol polymer has a viscosity-average degree of polymerization of 160 or more and 400 or less,
wherein a portion of the polymerization initiator is present at initiation of the polymerization and another portion is added during the polymerization, and
wherein the vinyl alcohol polymer has side groups consisting of hydroxyl and ester side groups.

15. The method according to claim 14,
wherein a polymerization conversion of the vinyl ester monomer reaches 79.0% or more within 180 minutes.

16. The method according to claim 14,
wherein the chain transfer agent is an alkylthiol having 6 to 12 carbon atoms.

17. The method according to claim 14,
wherein the polymerization initiator is an azo polymerization initiator whose a 10-hour half-life temperature is 66° C. or less or a peroxide polymerization initiator whose a 10-hour half-life temperature is 66° C. or less.

18. The method according to claim 14,
wherein the vinyl alcohol polymer has a degree of saponification of 35 mol % or more and 65 mol % or less.

19. The method according to claim 14,
wherein the vinyl alcohol polymer has a degree of saponification of 45 mol % or more and 65 mol % or less.

20. The method according to claim 14,
wherein the vinyl alcohol polymer has a viscosity-average degree of polymerization of 160 or more and 300 or less.

* * * * *